(12) United States Patent
Jeppesen et al.

(10) Patent No.: US 8,585,363 B2
(45) Date of Patent: Nov. 19, 2013

(54) WIND TURBINE COMPRISING A MULTIPLIED REDUNDANCY CONTROL SYSTEM AND METHOD OF CONTROLLING A WIND TURBINE

(75) Inventors: Ole Mølgaard Jeppesen, Risskov (DK); John Bengtson, Højbjerg (DK); Torben Møller Hansen, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1080 days.

(21) Appl. No.: 11/813,036

(22) PCT Filed: Dec. 30, 2004

(86) PCT No.: PCT/DK2004/000931
§ 371 (c)(1),
(2), (4) Date: Nov. 14, 2007

(87) PCT Pub. No.: WO2006/069573
PCT Pub. Date: Jul. 6, 2006

(65) Prior Publication Data
US 2008/0118354 A1 May 22, 2008

(51) Int. Cl.
*F03D 7/02* (2006.01)
(52) U.S. Cl.
USPC .......................................................... 416/1
(58) Field of Classification Search
None
See application file for complete search history.

(56) References Cited

U.S. PATENT DOCUMENTS

| 4,348,155 A | 9/1982 | Barnes et al. |
| 4,462,753 A | 7/1984 | Harner et al. |
| 5,584,655 A | 12/1996 | Deering |
| 7,256,508 B2 * | 8/2007 | Altemark et al. ............... 290/44 |
| 2003/0075929 A1 | 4/2003 | Weitkamp |
| 2003/0126060 A1 | 7/2003 | Lof et al. |
| 2004/0151575 A1 | 8/2004 | Pierce et al. |
| 2005/0012339 A1 * | 1/2005 | Mikhail et al. .................. 290/44 |

FOREIGN PATENT DOCUMENTS

| EP | 1286048 | 2/2003 |
| EP | 1340910 | 9/2003 |
| JP | 8123503 A | 5/1996 |
| JP | 2003113769 A | 4/2003 |
| WO | 2004/079185 | 9/2004 |
| WO | 2005/021962 | 3/2005 |
| WO | WO 2005021962 A1 * | 3/2005 |

OTHER PUBLICATIONS

International Search Report; PCT/DK2004/000931; Sep. 14, 2005.

* cited by examiner

*Primary Examiner* — Richard Edgar
(74) *Attorney, Agent, or Firm* — Patterson & Sheridan, LLP

(57) ABSTRACT

A wind turbine (1) comprising equipment under control is presented, which comprises at least one control system (14, 14A, 14B) for one or more of said main components, (5, 7, 9) of the wind turbine. The control system (14A) is multiplied by at least one further control system (14B) for controlling the same of said equipment under control. A control arrangement, a method as well as uses hereof are also presented.

19 Claims, 8 Drawing Sheets

WIND TURBINE COMPRISING A MULTIPLIED REDUNDANCY CONTROL SYSTEM AND METHOD OF CONTROLLING A WIND TURBINE

TECHNICAL FIELD OF THE INVENTION

The invention relates to a wind turbine, a control arrangement, a method of controlling a control system being multiplied by at least one further control system for controlling the same equipment under control of a wind turbine and uses hereof.

DESCRIPTION OF THE RELATED ART

Wind turbines are designed to face harsh and changing weather in a long period of years and still show a high dependability. Previously, the dependability has been achieved by designing wind turbines with a certain over-sizing in relation to the required under normal use of the wind turbine.

The tower, wind turbine blades and breaking systems may for example be over-sized in order to handle extreme weather situation or excessive forces during a malfunction such as loss of utility grid or control of the wind turbine rotor.

However, it is an increasing challenge to transport and handle the wind turbine components of large modern wind turbines. Consequently, the over-sized components are a significant problem in relation to size and weight during transport and handling as well as expensive in material costs.

Previously, it has also been known to have more than one component of a kind in a wind turbine. The redundancy is especially used with the components which face significant mechanical stress e.g. a hydraulic pitch actuator. The extra component may take on the workload in a short period after a main component has failed until the repair people arrive and thus enhances the availability and dependability of the wind turbine. However, the more than one component of a kind does not change or solve the above-mentioned problem regarding size and weight as well as material costs of wind turbine components.

BRIEF SUMMARY OF THE INVENTION

The invention establishes technique allowing more weight- and cost-efficient wind turbines to be built.

The invention relates to a wind turbine where the control system is multiplied by at least one further control system for controlling the same of said equipment under control.

Hereby is established a wind turbine without the above-mentioned disadvantages of the prior art. The elimination of single points of failure possibility in the control of equipment under control by securing the functionality on system level is advantageous. With the enhancing of the safety level and thus the reliability of the wind turbine it is possible to design the different wind turbine components to normal use and fatigue instead of designing for extreme loads.

The wind turbine tower may for example be designed with a "normal sized" material tightness as risk of malfunctions such as the risk of dangerous rotor overspeed due to loss of control is significantly diminished. The saved materials of a "normal sized" tower and other structural components of the wind turbine may exceed 25%.

The term "equipment under control" and "main components" should especially be understood as the wind turbine blades, gear (if any) and generator of the wind turbine.

The term "control system" should be understood as a system supervising and controlling a main component and including the necessary components in doing so.

In an aspect of the invention, said equipment under control being main components of the wind turbine such as the wind turbine blades.

In an aspect of the invention, said control systems being operating simultaneously and independently of each other. Hereby it is possible to continuously control the main component regardless that one control system fails. The wind turbine may thus continue to generate power until replacement of the failed system can be performed or be shut down in a controlled manner.

In an aspect of the invention, said control systems being operating simultaneously with dependent supervision of each other. Hereby, it is ensured that the control systems work together in an advantageously control of a main component.

In an aspect of the invention, said equipment under control comprises at least one pitch or active stall wind turbine blade. It is advantageous to use the invention in connection with large wind turbine blades as the pitch mechanism of each blade also is the only brake system of the rotor.

In an aspect of the invention, said at least one wind turbine blade is part of a wind turbine with two or three blades. It is especially advantageous to use the invention in connection with two-bladed wind turbines as loss of control in one blade may result in loss of the ability to stop the wind turbine rotor as such.

In an aspect of the invention, said wind turbine comprises a teeter mechanism including teeter angle sensors.

In an aspect of the invention, said control systems include the supervision systems for said pitch or active stall wind turbine blades.

In an aspect of the invention, one of said control systems comprises pitch and/or teeter components e.g. sensors such as blade load sensors, pitch position sensors, azimuth sensors and/or teeter angle sensors, actuators such as pitch actuators and/or teeter actuators, power supplies including UPS and/or controllers such as microcomputers. Hereby it is ensured that any type of failure is not fatal as the components of the system is multiplied and consequently that the one or more remaining control systems may continue the normal control of the wind turbine or at least stop the wind turbine in a controlled manner.

In an aspect of the invention, sensors in one of said control system are positioned differently in relation to the positions of the corresponding sensors in further of said control systems. Hereby it is ensured that damage to a section of the wind turbine component such as a pitch wind turbine blade e.g. by a stroke of lightning at sensors of the control system does not automatically affect the sensors of the further control system.

In an aspect of the invention, the wind turbine comprises more than two control systems e.g. three or four control systems. The number of further control systems may be chosen by the risk of damage to the system in order to achieve the necessary reliability of the wind turbine. The number may for example be chosen by the type of wind turbine, two or three-bladed, the place of erecting the wind turbine, frequent lightning storms, and the accessibility of the wind turbine e.g. an off-shore wind turbine.

In an aspect of the invention, the wind turbine comprises at least two control systems wherein one or more components of said systems are multiplied by at least two or three such as more than two pitch components, teeter components and/or controllers.

In an aspect of the invention, said control systems include a number of central controllers. Hereby, it is easier to position the controllers in a protected and safe environment.

In an aspect of the invention, said control systems include a number of distributed controllers e.g. controllers distributed at the wind turbine hub, the main shaft, the root of the wind turbine blade and/or inside the blade. Hereby, it is possible to enhance the reliability of the control systems as they may continue working if distributed controllers of one equipment under control fail. The distributed controllers of other equipment under control may take over the control from the failed controllers e.g. the controllers of one blade may control the control systems of two blades due to a failure in the controllers of one blade caused by a stroke of lightning in the blade.

In an aspect of the invention, said control systems are connected by cables such as individual cables between the components. Hereby are established separate connection circuits between the different sets and thus enhancing the high reliability of the control systems even further.

In an aspect of the invention, control systems are connected by a communication bus system e.g. using copper cables and/or fiber optic communication cables, radio and/or wireless communication connections such as bluetooth connections. The use of separate connection circuits, fiber optic communication cables and/or wireless communication especially ensures a higher reliability against malfunction after a stroke of lightning.

In an aspect of the invention, said control systems being partly or fully identical systems. Hereby, it is possible to enhance the common safety level of the control systems.

In an aspect of the invention, said control systems being a multiplied redundancy system. Hereby is an advantageous embodiment of the invention achieved.

The invention also relates to a control arrangement for a wind turbine rotor including at least two wind turbine blades, wherein said arrangement comprises a plurality of control systems for controlling the same wind turbine blade or the same part of the wind turbine blade, wherein at least controllers of said plurality of control systems are distributed at the wind turbine blade or the same part of the wind turbine blade being controlled, and wherein said control systems are connected.

Hereby, it is possible to enhance the safety of the control of the wind turbine rotor as the arrangement includes distributed but connected controllers whereby the control arrangement may continue controlling the wind turbine blades regardless of failure in one or more controllers.

In an aspect of the invention, said controllers include one or more microprocessors.

In an aspect of the invention, said control systems are connected by a communication bus system e.g. using copper cables and/or fiber optic communication cables, radio and/or wireless communication connections such as bluetooth connections. The bus system ensures that any data may be shared among the control systems and the controllers. Hereby, it is ensured that any blade in the wind turbine rotor may remain under control regardless of failure in some of the control systems and controllers.

In an aspect of the invention, said controllers are distributed at the wind turbine hub, the main shaft, the root of the wind turbine blade and/or inside the blade. By positioning the controllers locally in proximity of the equipment under control a simpler and more reliable construction of a control arrangement is achieved.

The invention also relates to a method of controlling a control system being multiplied by at least one further control system for controlling the same equipment under control of a wind turbine according to any of claims 1 to 18.

In aspects of the invention, said control systems are operated simultaneously and independently of each other or in dependency of each other by exchanging control communication. Hereby are advantageous embodiments of the invention achieved.

In an aspect of the invention, control communication is transferred on a communication bus system connecting said control systems. In a further aspect of the invention, said communication is transferred on a communication bus system between central or distributed controllers. Hereby are advantageous embodiments of the invention achieved.

The invention also relates to uses of a wind turbine, control arrangement and method in connection with emergency stop of the wind turbine during extreme situations such as weather situations or loss of a utility grid.

BRIEF DESCRIPTION OF THE FIGURES

The invention will be described in the following with reference to the figures in which.

DETAILED DESCRIPTION

Figure 1:
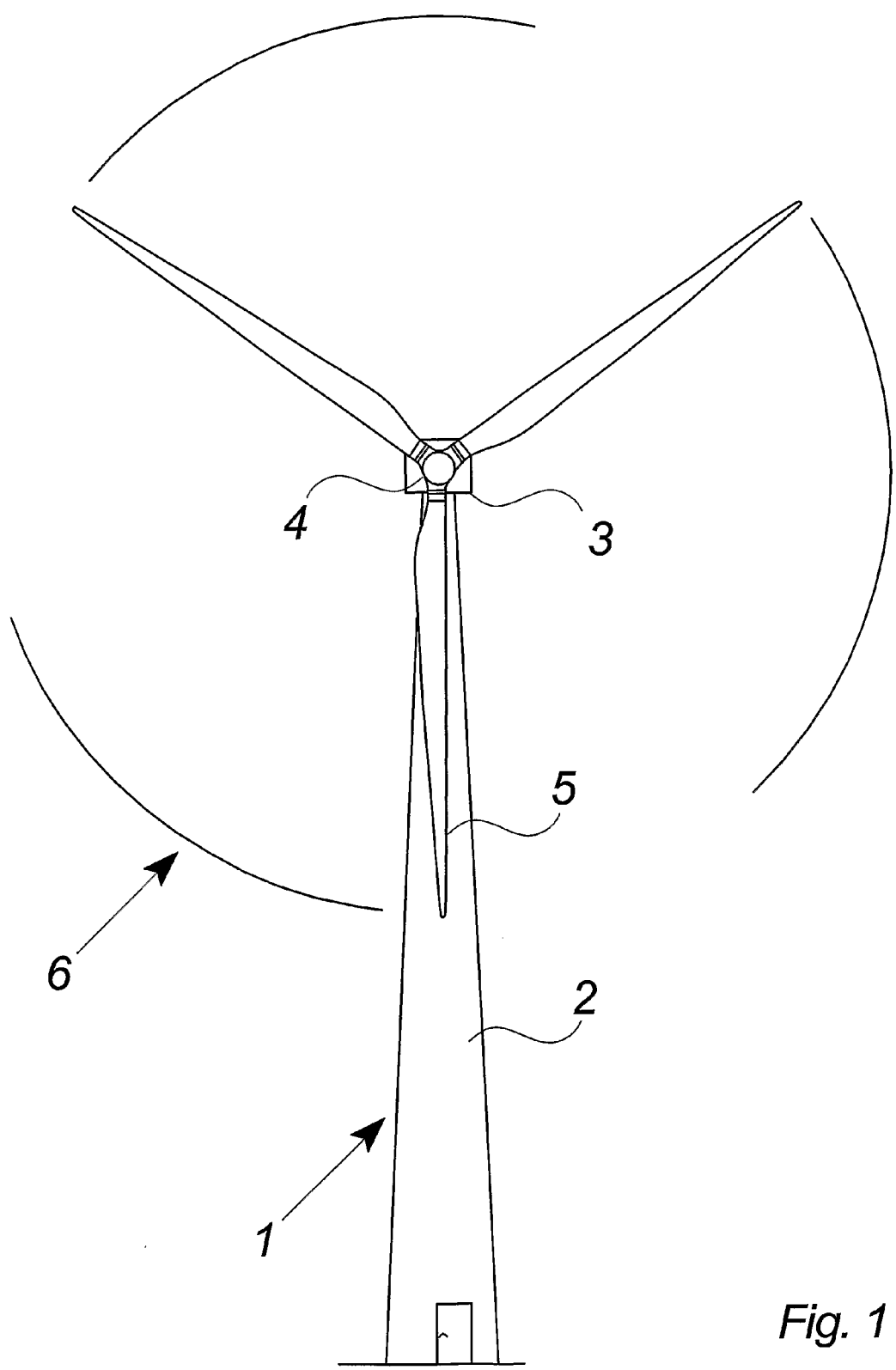
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower. The blades 5 of the wind turbine rotor are connected to the nacelle through the low speed shaft which extends out of the nacelle front.

As illustrated in the figure, wind over a certain level will activate the rotor and allow it to rotate in a perpendicular direction to the wind. The rotation movement is converted to electric power which usually is supplied to the transmission grid as will be known by skilled persons within the area.

Figure 2:
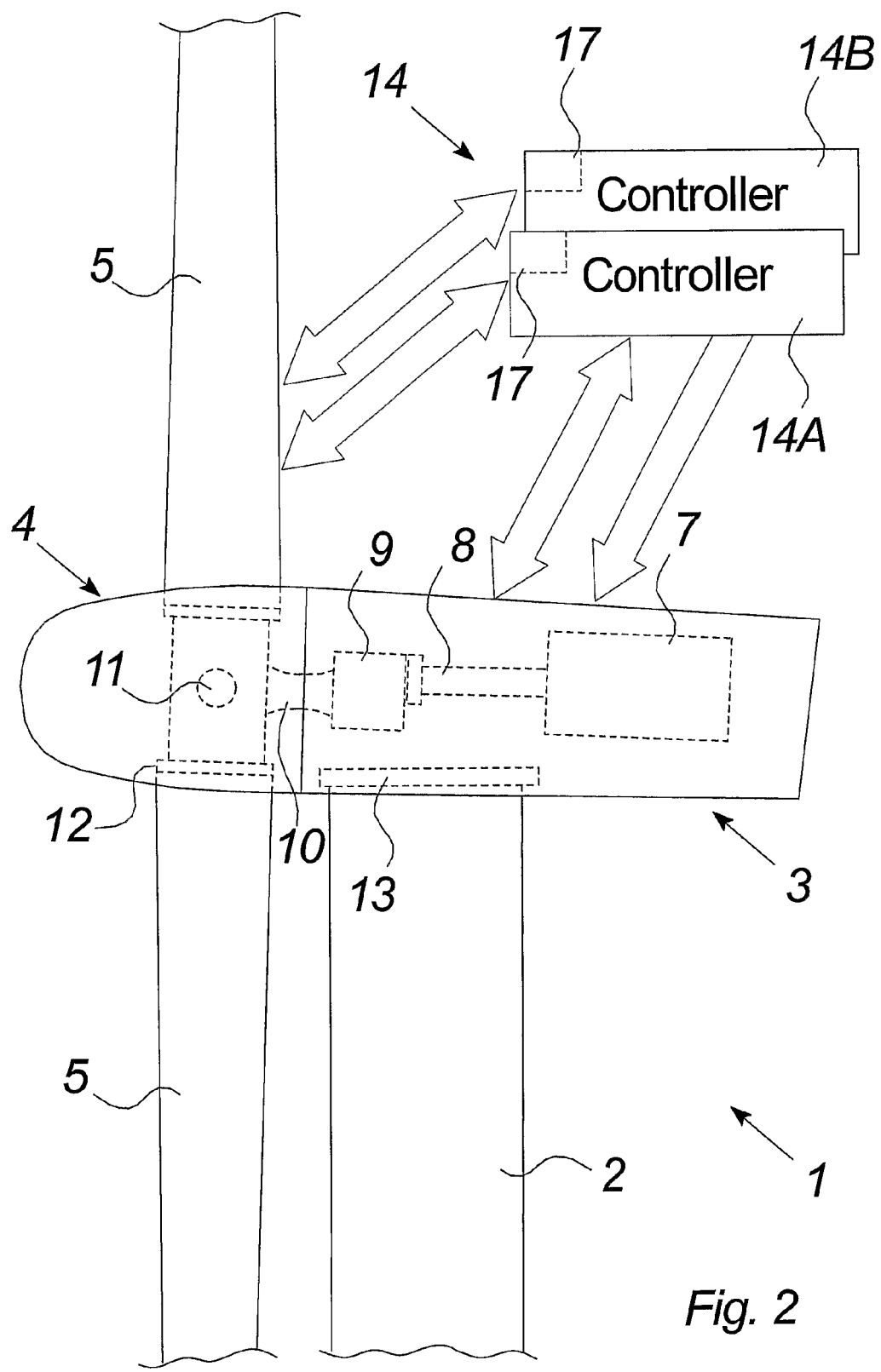
FIG. 2 illustrates schematically a section of a wind turbine according to the invention.

FIG. 2 illustrates schematically the equipment under control, i.e. the wind turbine blades 5, the gear 9, and the electric generator 7. The equipment under control are supervised and controlled by control systems 14 of a wind turbine according to the invention. The wind turbine further comprises the low and high speed shafts 10, 8 connecting the wind turbine blades 5, the gear 9, and the electric generator 7. Teeter mechanism allows the wind turbine blades to be angled in relation to a vertical plane.

The control systems 14 may supervise and control any of the equipment under control, such as the wind turbine blades 5, during normal use and stopping of the wind turbine.

According to the invention the control systems 14 comprise a first control system 14A which is multiplied by at least one further control system 14B for supervising and controlling the same equipment under control.

The control systems 14A, 14B are preferably identical systems in construction and performing the same functionality. They may operate simultaneously and independently of each other in supervising and controlling the same equipment under control.

Figure 3:
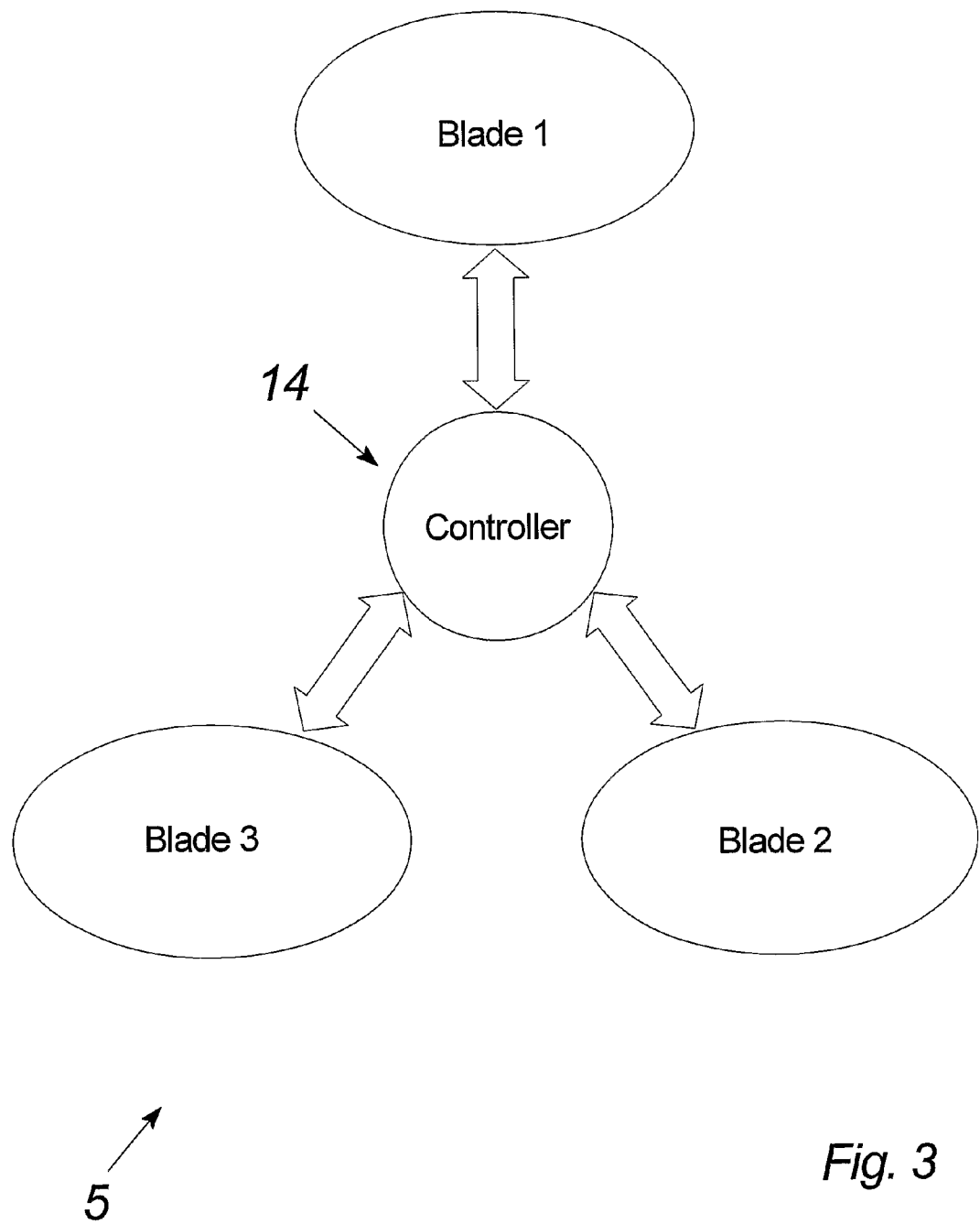
FIG. 3 illustrates schematically a central control system of a three-bladed wind turbine.

FIG. 3 illustrates schematically a central control system of a three-bladed wind turbine.

The figure illustrates how the wind turbine blades are centrally controlled from control systems wherein communication between components in the control systems and the blades are performed on a communication bus. The communication bus may be wired connections e.g. a communication bus system using copper cables and/or fiber optic communication cables. Further, the communication bus may include radio and/or wireless communication connections such as bluetooth connections between the control systems. The communication bus may for example use standard LAN technique.

The connection between the individual components of the control systems and the blades may be established by separate or common cables e.g. separate power cables transferring power to each relevant component.

Figure 4:
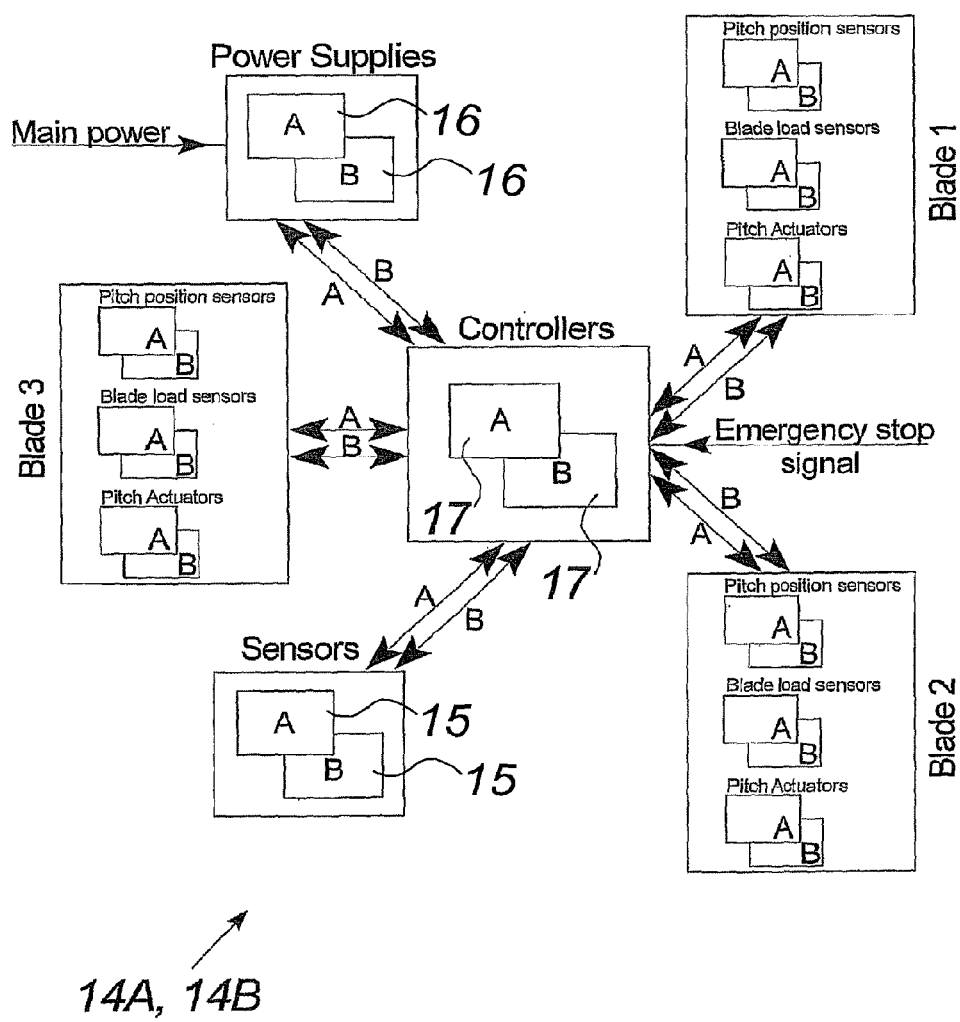
FIG. 4 illustrates the control system of FIG. 3 in further details.

FIG. 4 illustrates the central control system of FIG. 3 in further details wherein the control systems 14A, 14B are part of a three-bladed wind turbine.

Each set of control systems 14A, 14B comprises one or more microcontroller 17, μCtrl A, μCtrl B collecting, treating and transmitting data such as collecting data from the control system sensors in the relevant equipment under control and transmitting control data to control system components controlling the relevant equipment under control.

Examples of control system sensors and components are pitch position and blade load sensors as well as pitch actuators in relation to one wind turbine blade 5. The blade arrangement is replicated in all the blades 5.

Further, each set of control systems 14A, 14B may comprise an azimuth sensor 15 transmitting data to the blade microcontrollers 17.

The two microcontrollers 17 of the sets of control systems 14A, 14B are power supplied from their own separate power supplies 16 in which each power supply includes an uninterruptible power supply UPS A, UPS B. The two UPS power the control systems and allow the wind turbine to be controlled and stopped at a power blackout e.g. caused by a direct stroke of lightning on a power line.

The control system sensors of different sets may be positioned in proximity of each other e.g. one blade load sensor close to the next blade load sensor but preferably not at the same position on the wind turbine blade 5.

Figure 5:
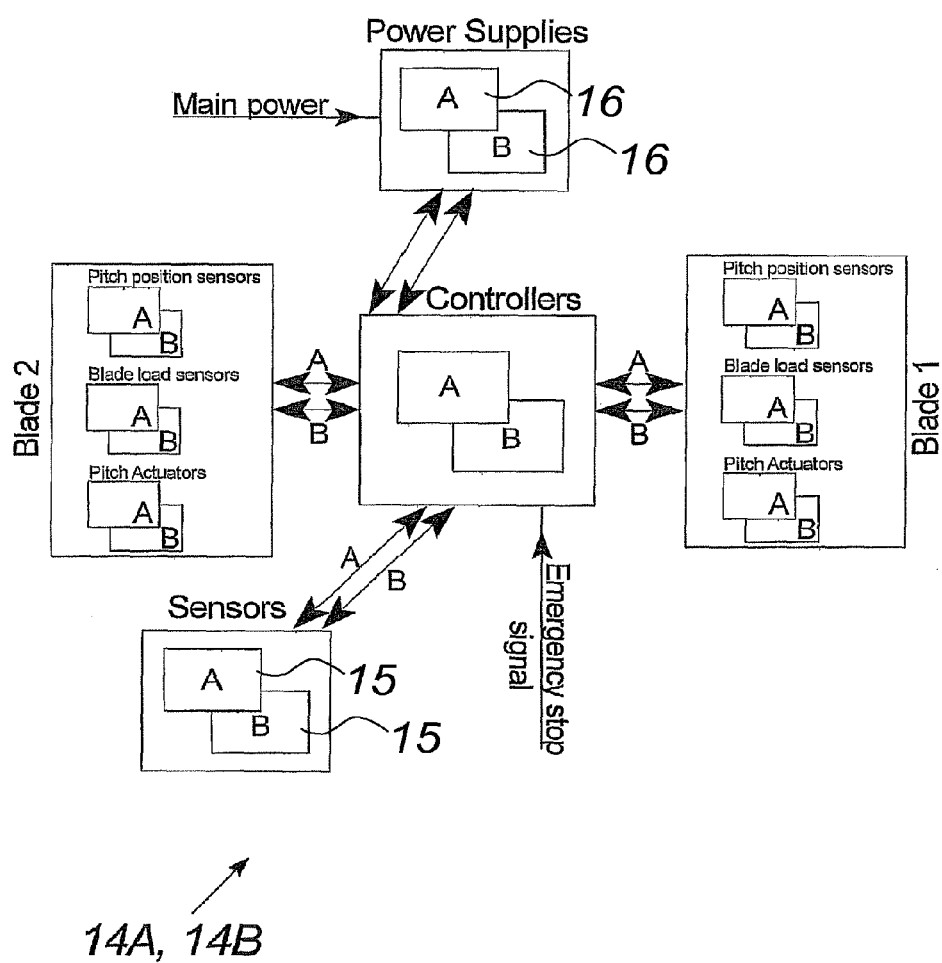
FIG. 5 illustrates the control system of FIG. 3 in details for a two bladed wind turbine.

FIG. 5 illustrates the central control system of FIG. 3 in a two-bladed wind turbine.

The structure of the control systems 14A, 14B of FIG. 4 substantially corresponds to the systems of FIG. 4. The situation of one blade less may initiate the use more than two identical control systems e.g. three or four control systems in order to enhance the security level against the wind turbine being damaged as a subsequent consequence of more than one control system malfunction.

The control system according to the invention may also be used in relation to other main components beside the wind turbine blades. The control system may for example also be used in connection with supervising and controlling the electric generator and thus ensuring that the generator does not face damaging work conditions as a subsequent consequence of a control system malfunction.

Figure 6:
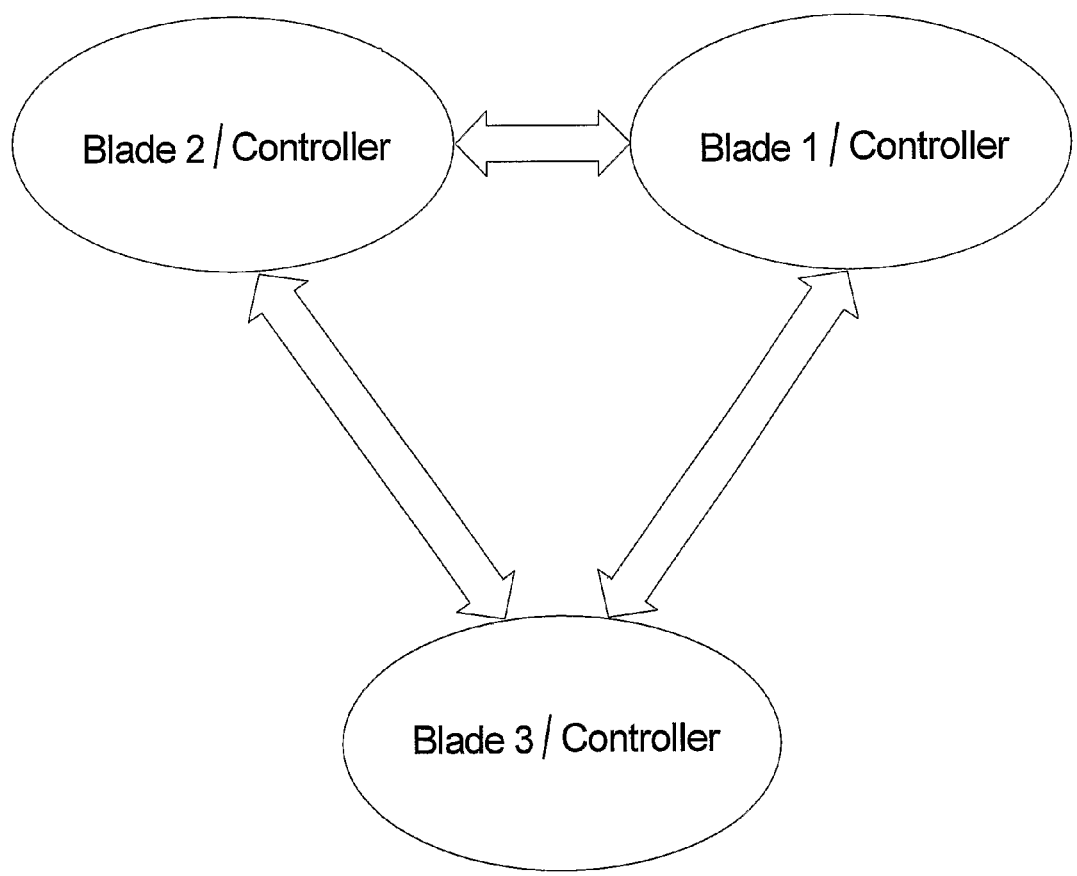
FIG. 6 illustrates schematically a control arrangement including distributed control systems of a three-bladed wind turbine.

FIG. 6 schematically illustrates a control arrangement including distributed control systems of a three-bladed wind turbine.

The figure illustrates how each wind turbine blade is controlled from control systems positioned locally at each blade. The communication between components in the control systems and the blades are performed on a communication bus e.g. corresponding to the communication bus mentioned in connection with FIG. 3.

Figure 7:
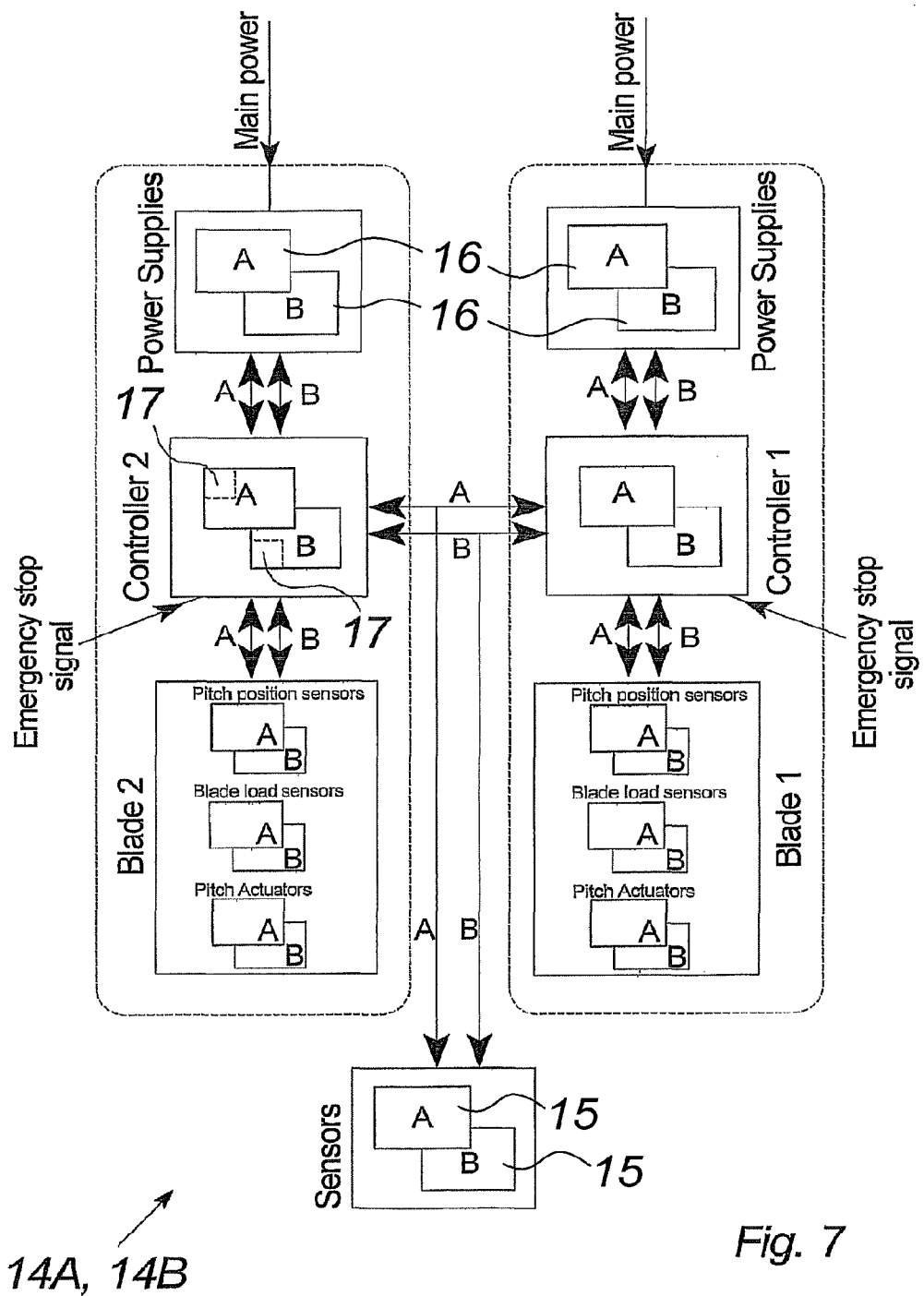
FIG. 7 illustrates the control arrangement including distributed control systems of a two-bladed wind turbine in details.

FIG. 7 illustrates a control arrangement including the distributed control systems of a two-bladed wind turbine in details.

The figure illustrates how the control system of each blade is multiplied e.g. in relation to sensors, controllers and power supplies including UPS. The controllers are connected in a local area network LAN and such may communicate and supervise each others functionality.

Figure 8:
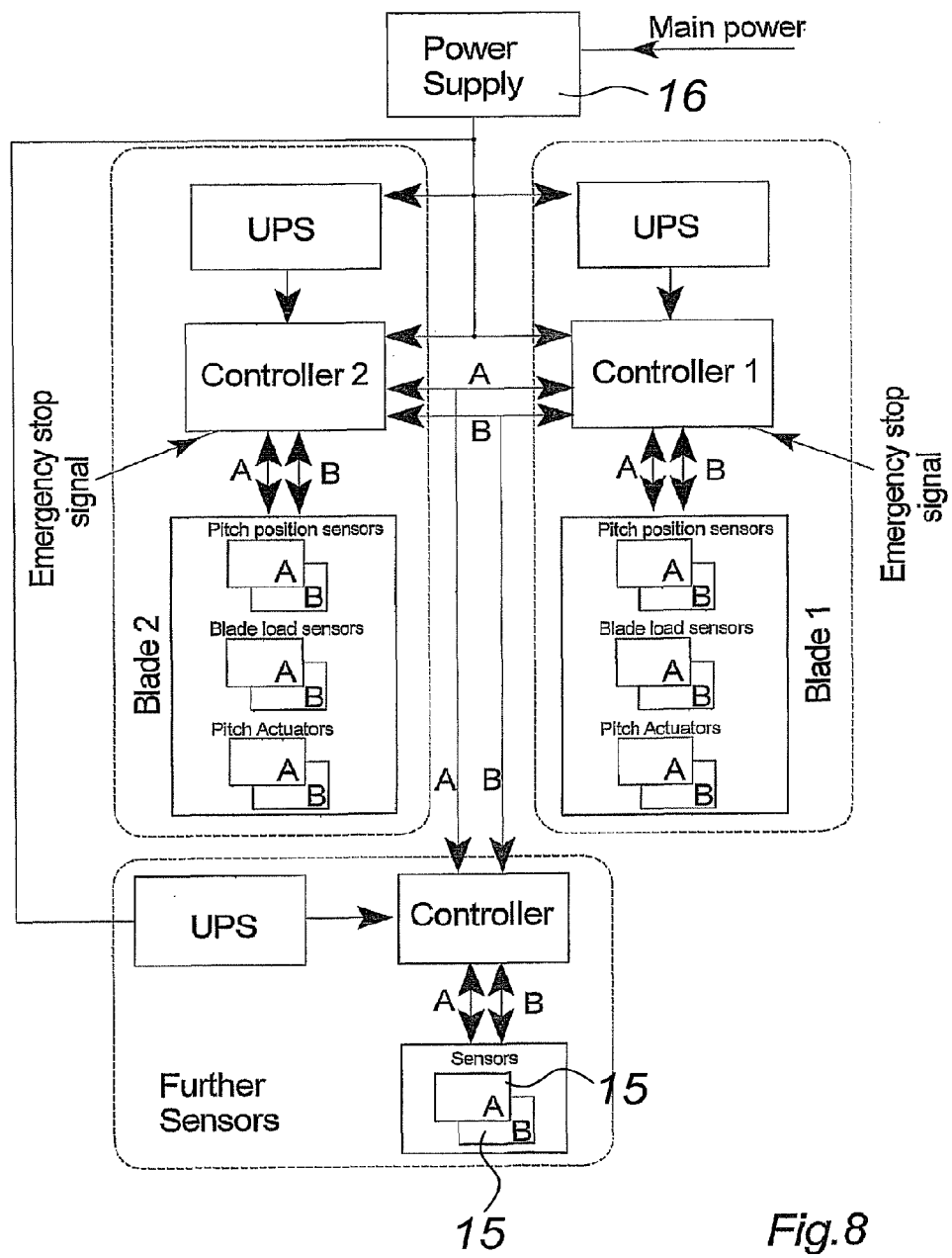
FIG. 8 illustrates another embodiment of the control arrangement including distributed control systems of a two-bladed wind turbine.

FIG. 8 illustrates another embodiment of the control arrangement including distributed control systems in a two-bladed wind turbine.

The controllers of the figure are connected by a communication bus in a LAN and as such establish multiplied controllers; controller 1, controller 2 and controller of the figure.

The wind turbine according to the invention may be part of a wind park where every wind turbine is connected to a central control station that responds to failure messages from the wind turbines such as a failed control system e.g. by sending maintenance people or a stop signal to the wind turbine.

The invention has been exemplified above with reference to specific examples of a wind turbine with control systems. The system may control the wind turbine in use or during a stopping process at a malfunction of one control system e.g. an emergency stop. However, it should be understood that the invention is not limited to the particular examples described above but may be designed and altered in a multitude of varieties within the scope of the invention as specified in the claims.

The invention claimed is:

1. A wind turbine comprising:
   a component;
   a first control system configured for controlling the component, the first control system including a first sensor located on the component configured to measure an attribute of the component, a first microprocessor in communication with the first sensor, and a first actuator in the component configured to adjust a parameter of the component based on control signals from the first microprocessor;
   a second control system configured for controlling the component, the second control system including a second sensor located on the component configured to measure the attribute of the component, a second microprocessor in communication with the second sensor, and a second actuator in the component configured to adjust the parameter of the component based on control signals from the second microprocessor; and
   a communication bus system connecting said first and second control systems,
   wherein said first and second control systems are configured to operate simultaneously for controlling the first and second actuators by exchanging control data.

2. The wind turbine according to claim 1, wherein the component comprises a main component of the wind turbine.

3. The wind turbine according to claim 1, wherein each of said control systems comprises a power supply.

4. The wind turbine according to claim 1, wherein the first sensor is positioned differently on the component in relation to a position of the second sensor on the component.

5. The wind turbine according to claim 1, wherein said first and second control systems are central controllers.

6. The wind turbine according to claim 1, wherein said first and second control systems are connected by the communication bus system using copper cables and/or fiber optic communication cables, or radio and/or wireless communication connections.

7. The wind turbine according to claim 1, wherein said first and second control systems comprise partly or fully identical systems.

8. The wind turbine according to claim 1, wherein said first and second control systems comprise a multiplied redundancy system.

9. The wind turbine according to claim 1, wherein the component is a wind turbine blade.

10. The wind turbine according to claim 1, wherein the first and second sensors are blade load sensors, pitch position sensors, azimuth sensors, or teeter angle sensors.

11. The wind turbine according to claim 1, wherein the component is a wind turbine blade, wherein the wind turbine blade comprises the first and second actuators that control the parameter of the wind turbine blade.

12. A control arrangement for a wind turbine rotor including at least two wind turbine blades, said arrangement comprising:
    a plurality of control systems for controlling the wind turbine blades, each of said plurality of control systems including a respective controller for controlling at least one of the wind turbine blades, each of the control systems including a respective sensor located on each of the wind turbine blades, each respective sensor configured to measure a blade attribute and to transmit data to the respective controller, and each of the control systems including a respective actuator in each of the wind turbine blades, wherein the respective actuators of a given wind turbine blade are configured to adjust a parameter of the given wind turbine blade; and
    a communication bus system connecting said control systems,
    wherein said control systems are configured to operate simultaneously for controlling the respective actuators of the given wind turbine blade by exchanging control data.

13. The control arrangement according to claim 12, wherein the respective controller comprises a microprocessor.

14. The control arrangement according to claim 12, wherein said control systems are connected by the communication bus system using copper cables and/or fiber optic communication cables, or radio and/or wireless communication connections.

15. The control arrangement according to claim 12, wherein said controllers are distributed at a wind turbine hub, a main shaft, a root of the wind turbine blade, and/or inside the blade.

16. The wind turbine according to claim 12, wherein the sensor of each of the control systems is positioned differently on the given wind turbine blade or the same part of the wind turbine blade in relation to a position of the sensor of the other control systems.

17. A method of controlling a plurality of control systems to control a component of a wind turbine, the method comprising:
    sensing an attribute of the component with a first sensor of a first control system, wherein the first sensor is located on the component;
    sensing the attribute of the component with a second sensor of a second control system, wherein the second sensor is located on the component;
    controlling a parameter of the component with a first actuator of the first control system using data from the first sensor and with a second actuator of the second control system using data from the second sensor; and
    operating said first and second control systems by exchanging control data on a communication bus system connecting the first and second control systems,
    wherein said control systems are configured to operate simultaneously for controlling the first and second actuators by exchanging the control data.

18. The method according to claim 17, where the first sensor is positioned on the component differently in relation to a position of the second sensor on the component.

19. The method according to claim 17, the component is a wind turbine blade, wherein the wind turbine blade comprises the first and second actuators that control the parameter of the wind turbine blade.

* * * * *